UNITED STATES PATENT OFFICE.

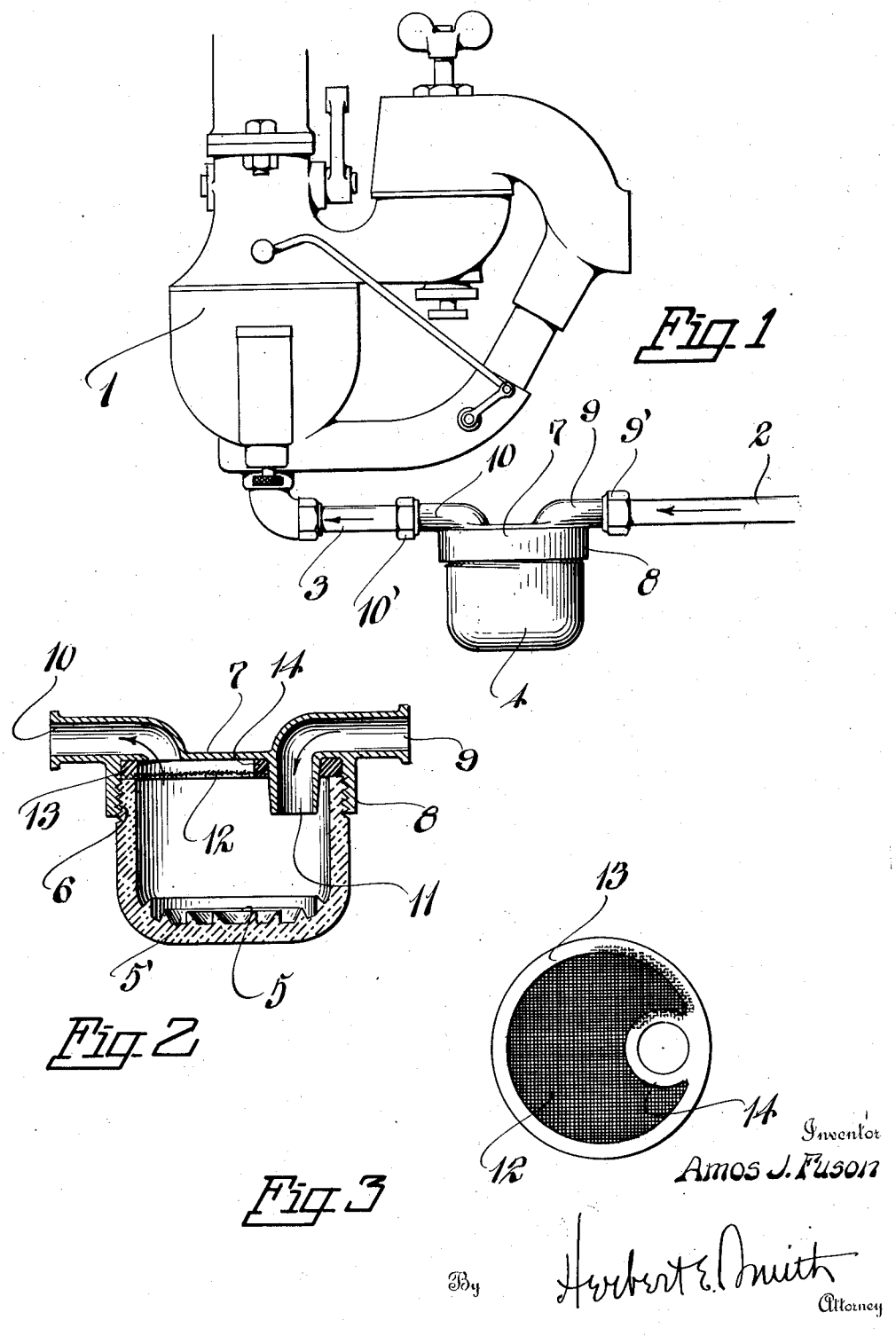

AMOS J. FUSON, OF SPOKANE, WASHINGTON.

GASOLENE-FILTER.

1,361,243.  Specification of Letters Patent.  Patented Dec. 7, 1920.

Application filed December 4, 1919. Serial No. 342,376.

*To all whom it may concern:*

Be it known that I, AMOS J. FUSON, a citizen of the United States, residing at Spokane, in the county of Spokane and State of Washington, have invented certain new and useful Improvements in Gasolene-Filters, of which the following is a specification.

My present invention relates to an improved gasolene filter designed for use especially in connection with internal combustion engines, and preferably located between the fuel supply tank and the carbureter of the engine, for the purpose of eliminating all foreign substances or materials from the gasolene, preparatory to vaporization and before the gasolene enters the carbureter.

With this end in view the invention contemplates the utilization of a device which is simple in construction and operation, readily assembled, and with facility may be dismantled, when required for cleansing the residue or sediment retained therein, and furthermore the minimum number of parts employed in the structure renders the device comparatively inexpensive in first cost as well as in maintenance.

The invention consists in certain novel combinations and arrangements of parts as hereinafter specified and claimed and set forth in the accompanying drawings wherein I have illustrated one complete example of the physical embodiment of my invention constructed and arranged according to the best mode I have so far devised for the practical application of my invention.

Figure 1 is a view in side elevation showing so much of a carbureter for an internal combustion engine and its connections, as is necessary to illustrate the application thereto of the filter embodying the invention.

Fig. 2 is an enlarged, detail sectional view through the filtering device, detached.

Fig. 3 is a top plan view of the detached filter element and its gasket.

In the preferred form of my invention as illustrated in the drawings I have indicated a standard form of carbureter 1 and the fuel supply pipe 2 from the usual tank, together with the inlet pipe 3 to the carbureter, the filtering device being located in the supply pipe adjacent the carbureter as shown.

In the construction of the filtering device I employ an open top bowl or cup 4, cylindrical in shape, and preferably of transparent material as glass in order that the contents of the bowl may be visible for inspection, and the interior bottom of the bowl is fashioned with a series of concentric rings or beads 5 of increasing diameter from the center out, and forming grooves 5' between them and between the outermost bead and the wall of the bowl. The grooves thus provided are receptacles for the sediment which sinks through the gasolene and falls to the bottom of the bowl, and when the foreign substances reach these grooves they are below the influence of the currents created by the inflowing gasolene, and consequently are not disturbed but lie quiescent, the beads forming obstacles or baffle rings to stop the lateral or horizontal movement of currents at the bottom of the bowl.

The bowl, of course, is a separable element, and when upon inspection it is found to require cleansing of the sediment from the liquid fuel, the foreign substances may be washed from the grooves, the glass permitting a thorough cleansing with proper tools. At its upper edge the bowl is provided with exterior threads 6 and is threaded into the cap 7, the flange 8 of the cap being also threaded to receive the bowl, and this metal cap, when suspended between the tank pipe 2 and the inlet pipe 3 to the carbureter, supports the bowl in position so that the latter may with facility be attached thereto or detached therefrom by proper turning.

The cap 7 is an integral member of suitable metal and is cast with a pair of diametrically located inlet and outlet coupling ends or pipes 9 and 10 which extend laterally from the cap plate 7 and have vertical openings into the interior of the bowl, while a pair of union coupling nuts 9' and 10' are utilized to connect them with the respective fuel pipes 2 and 3 as seen in Fig. 1.

The inlet pipe or coupling 9 is unlike that for the outlet in that it is fashioned with an angularly disposed nozzle 11 projecting downwardly into the bowl 4 to direct the inflowing liquid fuel into the bowl below the horizontally disposed filtering screen or diaphragm 12, and the currents of liquid are thus directed into and out of the bowl as indicated by the arrows in Fig. 2.

In Fig. 3 the filtering screen or diaphragm is shown to be part of the gasket 13, which is circular and of suitable diameter to fit snugly up within the flange 8 of the cap, and is clamped in the upper portion of the cap by the bowl when the latter is screwed home, the upper edge of the bowl being in close contact with the lower edge of the gasket.

To accommodate the nozzle 11 of the inlet coupling end 9, the gasket is fashioned with a socket or ring 14 integral therewith and of required diameter to insure a neat and snug fit between the parts. An inspection of Fig. 3 will disclose the simplicity and compactness in construction and arrangement of the device, which consists essentially of three separable elements i. e. the bowl, the cap, and the filtering gasket, and it will readily be apparent that the bowl may with facility, when required, be detached from the cap by backing it out of the threaded flange 8, and the filtering gasket may with equal convenience and despatch be withdrawn and cleansed by passing water under pressure through the wire filtering screen in the reverse direction to the movement of the gasolene through the screen.

From the above description taken in connection with the drawings it is obvious that the screen prevents and stops the passage of foreign substances through the filter as the gasolene flows according to the arrows in Fig. 2, and this accumulation of foreign substances, or sediment, may be dispensed with as described.

What I claim is—

1. The combination in a filtering device including a bowl, of integral, concentric rings forming grooves in the bottom of the bowl to receive sediment, and said rings also forming a current baffle element to prevent disturbance of the sediment, and a detachable cap having inlet and outlet pipes for the bowl.

2. The combination in a filtering device including a bowl having annular, concentrically arranged beads providing grooves in the bottom of the bowl, and said beads having angular walls, of a detachable cap on the bowl having inlet and outlet pipes, and said inlet pipe having an L-shaped nozzle projecting within the bowl.

3. The combination with a bowl and a detachable cap having integral inlet and outlet pipes, and an angular extension on the inlet pipe forming a nozzle extending downwardly in the bowl, of a filtering gasket and screen clamped between the cap and bowl above the open end of the nozzle and below said outlet pipe, and an open socket member integral with said gasket for reception of said nozzle.

In testimony whereof I affix my signature.

AMOS J. FUSON.